United States Patent Office 2,862,944
Patented Dec. 2, 1958

2,862,944

PROCESS FOR THE PREPARATION OF HIGH PURITY ALKYLTIN COMPOUNDS

Carl R. Gloskey, Avenel, N. J., assignor to Metal & Thermit Corporation, New York, N. Y., a corporation of New Jersey No Drawing. Application December 7, 1955
Serial No. 551,518

11 Claims. (Cl. 260—429.7)

The present invention relates to a new and improved process for the production of high purity alkyltin compounds and more particularly to a process for the production of trialkyltin chlorides, trialkyltin oxides and tetraalkyltins of high purity. High purity trialkyltin compounds are extremely effective as biocidal compositions.

Various methods of preparing trialkyltin chloride, trialkyltin oxide and tetraalkyltins are known to the art. The usual methods of preparation of these compounds result in the production of a final product, together with various impurities, which are predominantly, mixtures of the mono-, di-, and tri-alkyl compounds, with tetraalkyltin. Considerable difficulty has been encountered in the separation of the individual components of these crude mixtures, particularly the tetraalkyltin compounds from the trialkyltin chlorides because the boiling points of these compounds are close together. The problem of preparing trialkyltin chloride, trialkyltin oxide and tetraalkyltin in a substantially pure state has not been solved in any process, so far as I know, when carried into practice commercially on an industrial scale.

It has now been discovered that substantially pure trialkyltin oxide, trialkyltin chloride and tetraalkyltin can be produced by a relatively simple and efficient chemical reaction process.

It is an object of this invention to provide a process for the production of high purity trialkyltin chlorides.

It is also an object of the present invention to provide a process for the production of high purity trialkyltin oxides.

It is another object of the invention to provide a process for the production of high purity tetraalkyltin compounds.

It is a further object of the present invention to provide a method of recovering trialkyltin chlorides and tetraalkyltin compounds in high purity from crude mixtures containing the same.

It is also an object of the present invention to provide a method of recovering tetraalkyltin compounds in high purity from a crude mixture containing the same.

Other and more detailed objects will be apparent from the following description and claims.

The process of this invention comprises reacting an impure mixture of trialkyltin chloride and tetraalkyltin (contaminated with other materials, e. g., dialkyltin chloride, inert matter, etc.), with an aqueous solution of an alkali metal hydroxide, e. g., sodium hydroxide to form trialkyltin oxide and tetraalkyltin. The tetraalkyltin is separated from the mixture of reaction products in substantially pure form (about 99½% pure). The trialkyltin oxide is next separated from the reaction mixture. If trialkyltin chloride is desired, the trialkyltin oxide is reacted with an aqueous solution of hydrochloric acid, to form high purity trialkyltin chloride.

It is contemplated that the initial impure (crude) mixture contain between about 25% and about 75% trialkyltin chloride, and between 75% and about 25% tetraalkyltin. The crude mixture may contain large amounts of impurities, e. g., 50%, although contemplated mixtures would probably have less than 10% of impurities. The impure mixture of trialkyltin and tetraalkyltin compounds utilized as the reactants in this process may be produced in accordance with the teachings of U. S. Patent Nos. 2,569,492, 2,665,286, 2,675,-397, 2,675,398 and 2, 675,399.

In carrying out the process, a crude mixture containing the trialkyltin chloride and tetraalkyltin, e. g., tributyltin chloride and tetrabutyltin, is added to an aqueous solution containing between about 15% and about 20% by weight of sodium hydroxide with constant agitation. The reaction temperature is maintained between about 75° C. and about 85° C. with application of external heat. Agitation is utilized during the entire reaction. When the reaction is completed, the desired product, a mixture of trialkyltin oxide and tetraalkyltin, is in the organic phase. If solids form in the reaction mixture, they are removed by filtration. The phases are separated and the trialkyltin oxide is separated from the tetraalkyltin by distillation. If the trialkyltin oxide is stored, it should be in an inert atmosphere, preferably nitrogen which is most economical. If production of trialkyltin chloride is desired, the trialkyltin oxide is then added to an aqueous solution containing between about 10% and about 20% by weight of hydrochloric acid, preferably with constant agitation, to form trialkyltin chloride. At the completion of the reaction, the trialkyltin chloride is in the organic phase which is separated from the aqueous phase. Trialkyltin chloride is then separated by drying the hydrocarbon phase, heating to about 100° C., e. g., to 130° C., to evaporate residual water, filtering and then distilling out the trialkyltin chloride.

The relative amounts of the impure chloride mixture and the sodium hydroxide solution utilized, is such that there must be at least 1 mole equivalent of sodium hydroxide in the solution per mole equivalent of the trialkyltin chloride in the initial impure mix in order to convert all of the trialkyltin chloride to trialkyltin oxide in a given "pass" through the reaction. In a like manner, there must be at least 1 mole equivalent of hydrochloric acid, in the solution utilized, per 1 mole of trialkyltin oxide to be converted to the chloride. In each of the aforementioned cases, the 1:1 molar ratio is a minimum; actually, an excess of the reagent solution is preferred to give better yields. The maximum excess of sodium hydroxide is governed by the fact that trialkyltin oxide is soluble in sodium hydroxide and the use of large excess causes excessive losses.

The reactions are carried out between room temperature and the reflux temperature of the reaction mix and preferably between about 75° C. and about 85° C. A small but effective amount of an innocuous wetting agent (a wetting agent not reactive to any of the reactants, reaction products or other components of the reaction mixture), preferably between about 0.05% and about 0.15%, of the weight of water, such as the organic sulfonates, e. g., decylbenzene sulfonate (marketed in a diluted form under the trademark "Santomerse"), is preferably added to the impure reaction mixture to facilitate dispersion of the reaction products.

This invention is directed to preparation of alkyl organotin compounds containing up to about 22 carbon atoms in the alkyl chains. It is particularly applicable to the production of the tri- and tetra-butyltins, -isopropyltins, -ethyltins, -octyltins, and -dodecyltins. The tetraalkyltins have the type formula, $R_4Sn$; the trialkyltin chlorides have the type formula $R_3SnCl$; and the trialkyltin oxides have the type formula $(R_3Sn)_2O$. Specifically the butyltins would have the following formulas: $(C_4H_9)_4Sn$, $(C_4H_9)_3SnCl$ and $[(C_4H_9)_3Sn]_2O$.

For the purpose of giving those skilled in the art a better understanding of the invention, the following illustrative examples are given. It is to be understood, however, that this invention is not restricted thereto.

Example I

Two thousand five hundred and eighty (2,580) grams of a mixture containing 63.9% of tributyltin chloride, 31.2% of tetrabutyltin, 0.86% of dibutyltin chloride and 3.86% of inert matter, were slowly added to an aqueous solution containing 236 grams of sodium hydroxide and 1 ml. of "Santomerse" as a wetting agent in 1150 ml. of water. The addition was made slowly and the reaction allowed to proceed at a temperature of 75° C.–85° C. for a period of 1 hour with constant agitation. A separate aqueous phase (bottom) was taken off and the top phase was distilled at 135–165° C., 10 mm. Hg press. abs., to yield a pure tetrabutyltin distillate and 1,407 grams of substantially pure tributyltin oxide (still bottoms). One hundred and fifty (150) grams of this tributyltin oxide was blended with 84 ml. of 36% hydrochloric acid solution and reacted for a period of 1 hour at a temperature of 75° C. with constant agitation. 150 ml. of water were added. Two phases appeared, an aqueous phase on the bottom and a hydrocarbon phase on the top. The phases were separated and the hydrocarbon phase containing tributyltin chloride was heated to 130° C. to evaporate residual water. The material was then filtered and tributyltin chloride was separated from the remainder of the hydrocarbon phase by distillation at 135° C., 10 mm. Hg press. abs. The yield of tributyltin chloride was 94.2% of theory. It was 98.16% pure.

Example II

One hundred pounds of a crude mixture containing 54.78% of tetrabutyltin and 42.79% of tributyltin chloride was slowly added to an aqueous solution of 20 ml. of "Santomerse" and 7 pounds 15 ounces of sodium hydroxide in 4¾ gals. of water. The solution was slowly heated during the addition of the crudes. The reactor was then held for 1 hour between 75° C. and 85° C., with agitation. At the end of the hour, the reactor contents were separated into two phases. The organic phase was removed and subject to vacuum distillation between 135° C. and 155° C. under 10 mm. Hg press. abs., and 78 pounds 15 ounces (98.2% of theory) of tetrabutyltin was obtained as the distillate. The tetrabutyltin purity was above 99%. The tributyltin oxide, recovered as the still residue, had a tin analysis of 99.6% and a purity of 99.19%.

Example III

Following the procedure set-forth in Examples I and II, an impure mixture of triisopropyltin chloride and tetraisopropyltin is reacted with aqueous sodium hydroxide to yield substantially pure tetraisopropyltin and triisopropyltin oxide. The triisopropyltin oxide is then reacted with aqueous hydrochloric acid to yield substantially pure triisopropyltin chloride.

Example IV

Following the procedure set-forth in Examples I and II, an impure mixture of triethyltin chloride and tetraethyltin is reacted with aqueous sodium hydroxide to yield substantially pure tetraethyltin and triethyltin oxide. The triethyltin oxide is then reacted with aqueous hydrochloric acid to yield substantially pure triethyltin chloride.

Example V

Following the procedure set-forth in Examples I and II, an impure mixture of trioctyltin chloride and tetraoctyltin is reacted with aqueous sodium hydroxide to yield substantially pure tetraoctyltin and trioctyltin oxide. The trioctyltin oxide is then reacted with aqueous hydrochloric acid to yield substantially pure trioctyltin chloride.

Example VI

Following the procedure set-forth in Examples I and II, an impure mixture of tridodecyltin chloride and tetradodecyltin is reacted with aqueous sodium hydroxide to yield substantially pure tetradodecyltin and tridodecyltin oxide. The tridodecyltin oxide is then reacted with aqueous hydrochloric acid to yield substantially pure tridodecyltin chloride.

Trialkyltin oxide is also called "bis (trialkyltin) oxide."

The present invention provides an economic process for the production of trialkyltin chloride, trialkyltin oxide and tetraalkyltin of high purity. Trialkyltin chlorides and trialkyltin oxides are particularly efficacious as biocidal materials. They function generally as fungicides, insecticides, slimicides, miticides, etc. These materials are used as anti-bacterial agents and act to preserve such vulnerable materials as wood, leather, etc. Tetraalkyltins may be utilized as a starting material in the preparation of large numbers of organotin compounds.

While the invention has been described with particular reference to specific embodiments, it is to be understood that it is not limited thereto but is to be construed broadly and restricted solely by the scope of the appended claims.

I claim:

1. The process which comprises reacting an impure mixture comprising a trialkyltin chloride and tetraalkyltin with an aqueous solution consisting essentially of an alkali metal hydroxide dissolved in water, to form an aqueous phase and an organic phase, separating the aqueous phase from the organic phase, and distilling the organic phase to separate trialkyltin oxide from tetraalkyltin.

2. A process according to claim 1, including the further steps of reacting said trialkyltin oxide with an aqueous solution of hydrochloric acid to form substantially pure trialkyltin chloride, and recovering said substantially pure trialkyltin chloride.

3. The process which comprises reacting an impure mixture comprising between 25% and 75% by weight of trialkyltin chloride and between 25% to 75% by weight of tetraalkyltin with an essentially water solution of sodium hydroxide containing about 15% to about 20% by weight of sodium hydroxide and a small but effective amount of a wetting agent, to form an aqueous phase and an organic phase, separating said aqueous phase from said organic phase, and distilling said organic phase to separate trialkyltin oxide from tetraalkyltin.

4. A process according to claim 3, including the further steps of reacting said trialkyltin oxide with an aqueous solution containing about between 10% to 20% by weight of hydrochloric acid to form substantially pure trialkyltin chloride, and recovering said substantially pure trialkyltin chloride.

5. The process which comprises reacting with agitation an impure mixture comprising about 25% to 75% by weight of trialkyltin chloride and about 25% to 75% by weight of tetraalkyltin, with a water solution of sodium hydroxide containing between about 15% to 20% by weight of sodium hydroxide and between 0.05% to 0.15% of a wetting agent, at a temperature of between 75° C. and about 85° C. to form an organic phase and an aqueous phase, the molar ratio of said sodium hydroxide and trialkyltin chloride being at least 1:1, separating said organic phase from said aqueous phase, distilling said organic phase to separate trialkyltin oxide from tetraalkyltin, recovering said tetraalkyltin, reacting said trialkyltin oxide with an aqueous hydrochloric acid solution containing about 10% to 20% by weight of hydrochloric acid, at a temperature of about between 75° C. to 85° C., to form substantially pure trialkyltin chloride, and recovering said trialkyltin chloride, said trialkyltin oxide and hydrochloric acid being present in the molar ratio of 1:1.

6. A process according to claim 1, wherein the alkyl groups of said trialkyltin chlorides and said tetraalkyltin compounds contain up to 22 carbon atoms in the alkyl chain.

7. A process according to claim 1, wherein the alkyl groups of said trialkyltin chloride and tetraalkyltin are butyl groups.

8. A process according to claim 2, wherein the alkyl groups of said trialkyltin chloride and tetraalkyltin are butyl groups.

9. A process according to claim 3, wherein the alkyl groups of said trialkyltin chloride and tetraalkyltin are butyl groups.

10. A process according to claim 4, wherein the alkyl groups of said trialkyltin chloride and tetraalkyltin are butyl groups.

11. A process according to claim 5, wherein the alkyl groups of said trialkyltin chloride and tetraalkyltin are butyl groups.

References Cited in the file of this patent

Harada: Sci. Papers of the Inst. of Research of Phy. and Chem. Research (Tokyo) 35 (1939) pp. 290–329 at 298–8 and 300.

Investigations in the Field of Organotin Chemistry, Luijten et al., Tin Research Institute, Fraser Road, Greenford, Middlesex, England, October 1955, pp. 106–111.